Sept. 9, 1941.    H. W. KOST    2,255,469

FASTENER

Filed Aug. 1, 1940

Inventor
Harold W. Kost

By Malcolm W. Fraser

Attorney

Patented Sept. 9, 1941

2,255,469

UNITED STATES PATENT OFFICE 2,255,469

FASTENER

Harold W. Kost, Birmingham, Mich., assignor to Detroit Harvester Company, Detroit, Mich., a corporation of Michigan Application August 1, 1940, Serial No. 349,046

3 Claims. (Cl. 85—36)

This invention relates to fastening devices but more particularly to sheet metal fastening devices adapted to receive a screw or other fastener for holding parts in assembled relationship and an object is to produce a fastener of this character, which is of U-shape, and which can be more readily applied to the part to be joined as by forcing the fastener in position by hand without the use of a hammer or other similar tool.

Another object is to produce a U-shaped fastener which has centering means engageable in a hole of the part to be joined, the centering means having relatively greater flexibility to facilitate the application of the fastener to the part.

A further object is to produce a sheet metal U-shaped fastener, one arm of which is provided with screw thread engaging means, the other arm of which can be readily flexed away from the first arm to enable the fastener to be applied by hand in a convenient manner, sufficient resiliency being afforded to cause the arms intimately to embrace the part to be joined when the fastener is in applied position.

The invention is shown by way of illustration but not of limitation on the accompanying drawing in which Figure 1 is a perspective view of one form of the fastener showing the upper portion thereof;

Figure 6:
Figure 6 is a sectional view of the supporting panel and fastener showing the manner in which the fastener is applied to the panel.
Figure 7:
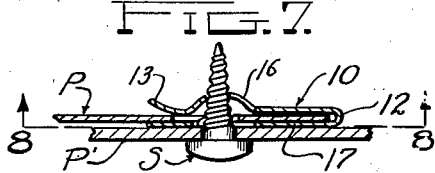
Figure 7 is a sectional view of the panel with the fastener applied thereto and a part to be joined secured in place by a screw.
Figure 8:
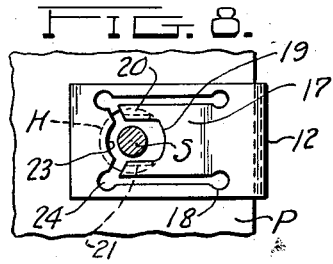
Figure 8 is a sectional view on the line 8—8 of Figure 7 showing the manner in which the ears engage in the aperture of the supporting panel for centering the fastener in position.

The illustrated embodiment of the invention shown comprises a sheet metal U-shaped clip or fastener having substantially parallel arms 10 and 11 of approximately the same length which are integrally connected by a curved wall 12 at one end thereof. The free edge of the arm 10 is outwardly curved as indicated at 13 to facilitate the application of the fastener to a supporting panel P (Figure 6). The arm 10 is formed with a screw receiving part in the form of a frusto-conical protuberance 14 having an opening 15 the edge of which is helically disposed to engage the thread of a screw, there being a radial slit 16 in the cone. Other forms of screw thread engaging means may be employed but more complete illustration and description of the form shown on the drawing is set forth in the patent to Harold W. Kost No. 2,169,182, dated August 8, 1939.

Integral with the arm 11 and formed by stamping out a portion of the metal is what may be termed a peninsular flap 17, the end adjacent the curved wall 12 being integral with the arm 11 and the opposite end being free thereby providing a flap which is of greater flexibility than that of the arm 11. To aid in the flexibility of the flap, round holes 18 are provided at the inner end of the flap and the sides of the flap are spaced a slight distance from the adjacent portion of the metal forming the arm 11. The free end of the flap 17 is formed with a rounded notch 19 which affords adequate clearance for the reception of a screw or other fastener intended for engagement with the helical edge portion of the opening 15 in the arm 10.

The notch 19 forms a pair of forwardly extending fingers 20 and on the inner edge of each of the fingers 20 the metal is turned downwardly to provide ears 21 which are disposed at substantially right angles to the flap 17. Each of the ears is formed with a sloping or cammed surface 22 which inclines from the free end of the fingers 20 inwardly toward the arm 10 and rearwardly toward the curved connecting wall 12. These cammed or sloping surfaces 22 facilitate in the application of the fastener to the supporting panel. As shown in Figure 6, the cam surfaces 22 ride over the free edge of the panel P and gradually flex the flap 17 outwardly to enable the fastener to be applied in such manner that the arms 10 and 11 embrace opposite sides of the panel. It will be manifest that the outward flexing of the flap 17 can be accomplished more readily than the flexing of the entire arm 11 so that the fastener can be forced into position on the panel P by hand instead of employing a hammer or similar tool which would otherwise be necessary. It will be understood that the fastener is forced over the panel P until the ears 21 snap into the hole H thereby centering or properly positioning the fastener so that a screw may be inserted through the hole into threaded engagement with the frusto-conical protuberance 14.

When the fastener is in this position, a part to be joined, such as panel P', having an opening to register with the opening H may be applied in position and a screw S inserted through the registering openings and into threaded engagement with the protuberance 14, as will be readily understood.

Figure 1:
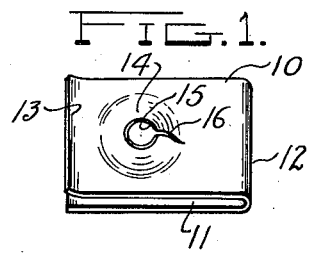
Figure 2:
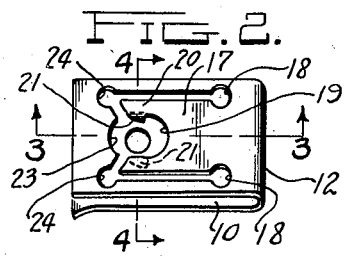
Figure 2 is a perspective view of the fastener showing the underside thereof.
Figure 3:
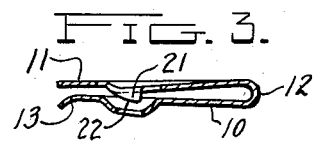
Figure 3 is a longitudinal sectional view on the line 3—3 of Figure 2.
Figure 4:
Figure 4 is a transverse sectional view on the line 4—4 of Figure 2.
Figure 5:
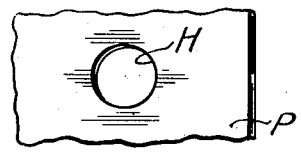
Figure 5 is a fragmentary view of a supporting panel or part to be joined formed with a screw receiving opening.

As shown in Figure 2, the arm 11 has a curved wall 23 which faces the notch 19 and for convenience in manufacture, apertures 24 are formed by cutting out portions of the metal in advance of the fingers 20.

It is to be understood that numerous changes in details of construction, arrangement and operation may be effected without departing from the spirit of the invention especially as defined in the appended claims.

What I claim is:

1. A fastener comprising a sheet metal body of substantially U-shape providing two approximately parallel arms integrally joined at their ends, a fastening device on one of said arms, a peninsular flap on the other of said arms, a pair of finger portions laterally spaced from each other on the end of said flap to form a notch to provide clearance for the passage of a fastening member, an ear on each of said finger portions formed by bending the metal thereof at substantially right angles thereto for engaging an opening in a part to be joined, and a sloping surface on each ear facilitating the application of the fastener to the part to be joined.

2. A fastener comprising a sheet metal body of substantially U-shape providing two integral arms in spaced approximately parallel relationship, a thread engaging member on the first of said arms, a peninsular flap integral with the second of said arms adjacent the closed end of the U-shaped body and extending longitudinally between the lateral edges of said second arm in the general plane thereof, a notch in the free end of said flap to provide clearance for passage of a threaded member through said second arm to said thread engaging member on said first arm, and an ear on each side wall of said notch extending out of the general plane thereof toward said first arm to engage an opening in a panel and retain said fastener in position relative thereto.

3. A fastener comprising a sheet metal body member of substantially U-shape providing two integral arms in spaced approximately parallel relationship, a thread engaging member on the first of said arms, a peninsular flap integral at one end with the second of said arms and extending longitudinally between the lateral edges of said second arm in the general plane thereof, a notch in said flap to provide clearance for passage of a threaded member through said second arm to said thread engaging member on said first arm, and means projecting from the edge of said notch out of the general plane of said second arm toward said first arm to engage an opening in a panel and retain said fastener in position relative thereto.

HAROLD W. KOST.